Sept. 29, 1925.  1,555,081
J. A. SERRELL ET AL
STEAM AND VENT TRAP APPARATUS
Filed April 27, 1923   2 Sheets-Sheet 1

INVENTORS
John A. Serrell
James L. Fitts &
Karl W. Rohlin
Harry L. Duncan
ATTORNEY.

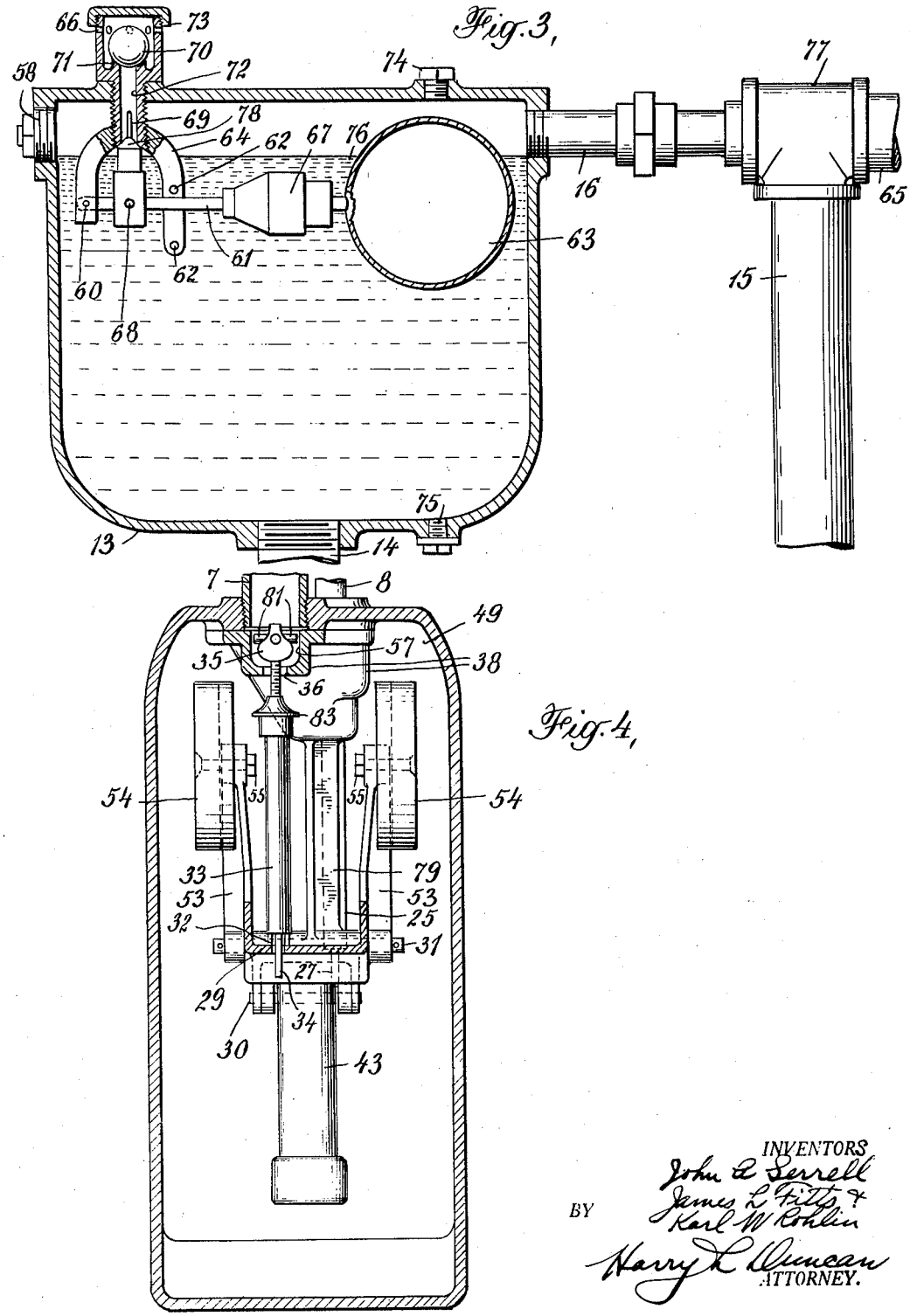

Patented Sept. 29, 1925.

1,555,081

UNITED STATES PATENT OFFICE.

JOHN A. SERRELL, OF NORTH PLAINFIELD, JAMES L. FITTS, OF PENSAUKEN TOWNSHIP, CAMDEN COUNTY, NEW JERSEY, AND KARL W. ROHLIN, OF PHILADELPHIA, PENNSYLVANIA; SAID FITTS AND SAID ROHLIN ASSIGNORS TO WARREN WEBSTER AND COMPANY, OF CAMDEN, NEW JERSEY, A CORPORATION OF NEW JERSEY.

STEAM AND VENT TRAP APPARATUS.

Application filed April 27, 1923. Serial No. 634,944.

*To all whom it may concern:*

Be it known that we, JOHN A. SERRELL, a resident of North Plainfield, Somerset County, New Jersey, JAMES L. FITTS, a resident of Pensauken Township, Camden, Camden County, New Jersey, and KARL W. ROHLIN, a resident of Philadelphia, Philadelphia County, Pennsylvania, all United States citizens, have made a certain new and useful invention relating to Steam and Vent Trap Apparatus, of which the following is a specification, taken in connection with the accompanying drawings, which form part of the same.

This invention relates especially to boiler return and vent trap apparatus adapted for use in low pressure steam heating plants to receive and return the condensation water to the boiler. The return trap, which may advantageously be used for this purpose, comprises a casing connected to the wet and dry returns near the boiler and considerably, or at least somewhat above the boiler water level. A float device is arranged within this trap to automatically open and close the steam and the vent or exhaust connections to the trap so that it can automatically discharge the water into the boiler after receiving a charge of this condensation water from the dry return system. For this purpose a float device is arranged in the trap and preferably pivotally mounted so as to open these steam and vent valves alternately, and preferably a suitable controlling device is operatively connected to the float so as to promote its prompt operation when the water reaches or approaches the prearranged high and low water levels in the trap. For this purpose a controlling weight may be connected to the float, preferably at such an angle to the float lever arm that the turning moment of this weight changes sign during each movement of the float device so that the control weight or other device exerts a restraining action on the float in each extreme position; but as soon as the float begins to move in either direction this restraining action decreases in amount and finally becomes an accelerating force that continues and quickly completes the operating movement of the float even after the initial buoyancy of the rising float or its unbalanced weight when descending have ceased to be effective in promoting further movement. The operation of the float device is thus made so much more positive and definite that it is practically impossible for the float device to hang or stick in any intermediate position or to fail to properly operate the valves; and this increasing operating force of the controlling weight carries the float device so quickly and continuously from one extreme position to the other that the valves may advantageously be made of the more efficient unbalanced self-closing type.

It is advantageous in many cases to use this boiler return trap in connection with a vent trap of about equivalent water capacity which may advantageously be connected at a slightly higher level to preliminarily receive the condensation water and store the same during that portion of the cycle of operation when the return trap is discharging under boiler pressure; and then, when the float controlled valve in the return trap has operated to vent the pressure in the return trap, the condensation water which has accumulated in the vent trap can quickly flow into the return trap, this arrangement increasing the quickness of operation and capacity of the return trap and at the same time forming an emergency or auxiliary return device besides discharging the air from the dry return adjacent the boiler.

In the accompanying drawing showing in a somewhat diagrammatic way an illustrative embodiment of this invention:

Fig. 3 is a vertical section through the vent trap showing the vent valve closed, and Fig. 4 is a transverse section through the boiler return trap taken substantially along the line 4—4 of Fig. 2.

Figure 2:
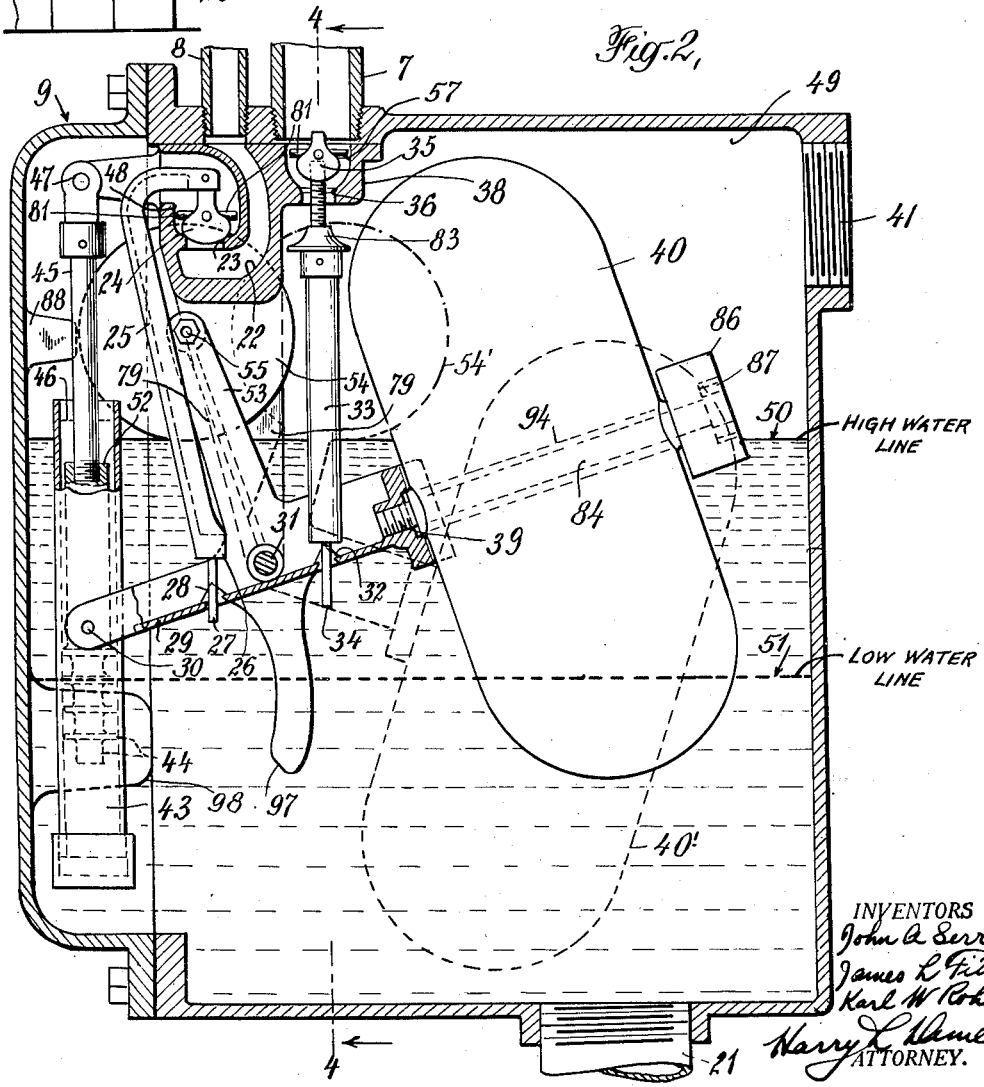
Fig. 2 is an enlarged vertical section through the boiler return trap.

As shown in Fig. 2, the boiler return trap may comprise a casing 49 of cast iron or other suitable material which may have a removable cover 9, bolted thereto so as to form a water tight joint. This casing may be formed with various inlet and discharge openings such as 21, 41, one or both of which may be connected to the piping adjacent the boiler. A steam pipe connection 7 and vent or exhaust pipe connection 8 are also provided in this casing adjacent a valve device 38 which is rigidly bolted or otherwise secured within the casing. The float device is movably mounted within the casing in any suitable way, and may be conveniently pivoted directly to the casing walls or to this valve device 38 which may be formed with a supporting bracket 79 for this purpose so as to properly support the float pivot 31 determining the oscillating movements of the float lever 29 and connected float 40. This elongated or cylindrical float may be secured to the float lever by the float stem 84 having its end 39 screwed into the lever which may be shaped so as to partly embrace this float and hold it in alignment when the float is bolted on this stem, which may extend through a central tube 94 in the float. It is usually desirable to have an adjusting weight such as 86 secured to the float lever or float so that it has the desired buoyancy in connection with the lever, and this interchangeable adjusting weight 86 may be secured on the end of this float stem 84 as by the counter-sunk nut 87.

The controlling device may be in the form of one or more controlling weights 54 cast or mounted on the float lever or device at a suitable angle to the float, and for this purpose one or more of these controlling weights 54, may if desired, be mounted on controlling arms 53 extending substantially at right angles to the float lever 29 so as to swing through a vertical line above the float pivot during the movements of the float device. The full line position of these parts in Fig. 2 corresponds to the upper extreme position of the float device when it has risen from its lower extreme position shown in dotted lines as soon as the water in the return trap reaches the high water line 50 indicated. At the beginning of this movement the nearly submerged float in the position 40' has attained sufficient buoyancy so as to overcome the restraining action of the controlling weights 54' in their dotted position in which their turning moment is opposed to the lifting action of the float; and this restraining action of the controlling weights 54 gradually decreases as the float device moves and brings the weights and their controlling arms more nearly above the float pivot 31. In this vertical position the weights exert no turning moment on the float lever, and their further movement beyond this vertical neutral position toward the full line position shown in Fig. 2 is accompanied by a gradually increasing accelerating or assisting action which they exert on the float device so as to promote its rising movement into this full line position. It is thus possible to have the restraining action of these one or more heavy controlling weights hold the float device practically stationary in its lower dotted position, while the water level in the return trap gradually rises from the low water line 51 to practically the high water line 50; and then when the float device finally starts upward, the increasingly accelerating action of the controlling weights insures its quick, continuous and effective upward movement which has ample power to operate the desired valves, preferably at about the mid part of the movement of the float device. In the same general way the controlling weight or weights exert a restraining action tending to maintain the float device in its full line extreme raised position until the water level has sunk practically to or adjacent the low water line 51; and then the weight of the float, which is unbalanced except for the very slight submerged portion below the low water line 51, is sufficient to start the float device in its downward swinging movement and overcome this initial restraining action of the controlling weights. The controlling weights similarly promote and accelerate this downward movement of this float device during its latter down stroke, since their turning moment in opposing this movement gradually decreases as the weights 54 near a vertical neutral position above the float pivot 31, and from that point onward the weights exert a gradually increasing action tending to force the float device downward into its dotted line position into the water remaining in the trap which considerably retards and cushions the last stage of this downward movement.

It is usually desirable to still further cushion these accelerated movements of the float device, and any suitable cushioning device may be employed in this connection, preferably of the fluid resistance or dash pot type. For this purpose a dash pot cylinder 43 may be connected to the float lever as by one or more pins or pivots 30 so that this cylinder is moved vertically whenever the float device operates. A plunger 52 having suitable plunger flanges 44 of such number and size as to give the amount of cushioning action desired may be mounted within this dash pot cylinder, and its connected stem 45 may be mounted as by the pin or pivot 47 to an extension or bracket on the valve device 38. Thus each movement of the float device produces a corresponding vertical movement of this dash pot cylinder so as to regulate and assist in cushioning this movement and minimize undesirable noise and impact of the parts. By having this cushioning cylinder 43 extend considerably above the water line in the trap casing it becomes filled up to about the point 46 with relatively pure water by condensation of the steam in the trap which forms a desirable cushioning fluid for this purpose. This dash pot device is preferably so arranged that as the float device descends into its dotted position the bottom of the cylinder 43 is brought into engagement with the lower end of the plunger so as to limit this downward movement; or preferably a stop projection 97 on the float lever engages a stop 98 cast on the casing cover 9 and planed or finished in the plane of the cover joint, so as to secure definite alignment. The movement of the float device in the other direction may be limited by similar positive stops or by the stops 88 formed on the cover 9 so as to be engaged by the controlling weights 54 when the float device has risen into its desired upper position. This makes more definite the extreme positions and the resulting restraining action exerted by these controlling weights, so that the movement and action of the float device may thus be rendered more definite and reliable.

While of course the proportions, arrangements, and operative connections of these parts can be varied considerably so long as the controlling weight or weights have an initial restraining moment tending to hold the float device stationary in each of its extreme positions, and then promoting and accelerating the movement of the float device when it once starts in either direction while the float exerts an initial starting impulse in each direction and finally resists or cushions the final stage of each movement; yet the illustrated arrangement is desirable in having the controlling weights and float rigidly connected into a unitary float device which minimizes noise and is quite effective in operation. The float 40 may have the vertically elongated or substantially cylindrical form shown, preferably at least several times as long as the rise in water level in the trap, which tends to promote the considerable angular movement of the connected float lever; and as seen in Fig. 4 this float lever may swing about the pivot 31 supported as by the centrally arranged supporting bracket 79, and this float lever may have the two symmetrically arranged lateral controlling arms 53, each of which have the substantial controlling weight 54 cast integral therewith or secured thereto as by the bolt 55. This leaves the central part of the float lever free for the operating connections for the valves which may comprise the steam valve 35 mounted on the weighted lifting rod 33 so as to cooperate with the valve seat 36, while the reduced stem 34, which may be provided at the lower end of this lifting rod, passes through an aligning aperture in the float lever on one or both sides of which suitable knife edge or other lifting members 32 may be formed to engage and raise the bottom of this lifting rod. Thus in the upper full line position of the float device these lifting members 32 have engaged this lifting rod and raised the steam valve 35 away from its seat 36 so that steam from the boiler or elsewhere may enter the return trap through the pipe 7 and passage 57; a deflector 83 of any suitable form being preferably arranged adjacent or upon the upper part of this lifting rod to laterally deflect this entering steam and prevent undesirable boring of the steam jet into and heating of the water in the trap, which means unnecessary steam condensation as well as undesirable noise. Guide fins such as 81 may be provided on this valve 35 so as to be loosely guided in the passage 57 and promote the lateral alignment of the valve during its vertical movement. The vent valve 24 may be mounted on a bent lifting arm 25 preferably having a similar reduced stem 27 extending through the float lever, so that the knife edge lifting members 28 can engage and raise the bottom 26 of this lifting arm and valve, when the float device moves into its dotted position shown in Fig. 2. This raises the valve from its seat 23 and opens the vent passage 22 communicating with the vent or exhaust pipe 8 in the casing so as to vent the pressure in the return trap and allow the condensation water to enter from the dry return until the water level rises to about the high water line 50 indicated. This vent valve 24 may be provided with similar guide fins 81 cooperating with the enlarged passage or valve chamber 48 so as to promote the lateral adjustment of the valve during these movements.

Figure 1:
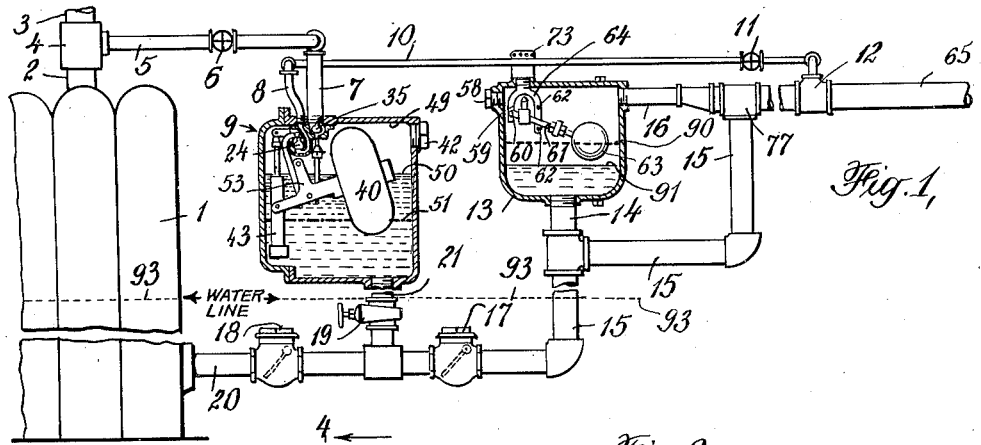
Fig. 1 is a vertical section indicating the general arrangement of the return trap and vent trap and connected piping adjacent the boiler.

The return trap may be connected to the boiler as indicated in Fig. 1 and is preferably located considerably above the water line 93 of this boiler 1. If desired, the connection 21 may serve as a water inlet and outlet for this return trap, in which case the threaded opening 41 may be closed by the plug 42. This water connection 21 preferably comprises a cut off valve 19, which may be shut when the trap is being inspected or repaired, and this connection may lead into the wet return 20 at any convenient place adjacent the boiler, preferably between two check valves 17, 18. The return trap also has the steam pipe 7 connected to the boiler or to a steam riser 2, 3, therefrom, which may have the pipe and interposed shut off valve 6 connected to the T connection 4 in this riser. The vent or exhaust pipe 8 of the return trap is preferably connected through the pipe 10 and shut off valve 11 to the T connection 12 on the dry return 65 from the heating or piping system, which is preferably air vented adjacent this point. In this way whenever the return trap is vented by the lifting of the vent valve 24 shown more in detail in Fig. 2; the steam in the trap can pass through this vent or exhaust pipe 8, 10 into the dry return, where by imparting its heat to the water of condensation, it condenses without objectionable discharge into the atmosphere. It is also desirable to connect adjacent the return trap and preferably at a somewhat higher level, a vent trap 13 which may have a water connection with the dry return through the pipes 14, 15 and the T connection 77, while the pipe 16 above the water line equalizes the pressure in the air space in this trap with the adjacent part of the dry return pipe 65. When, for instance, the level of water in the return trap is at the high water line 50 and the trap begins to discharge under boiler steam pressure, the condensation water can no longer flow into the return trap from the dry return which in modulation or other low pressure heating systems may at times be at several pounds less pressure than the boiler steam pressure. The condensation water from the dry return therefore collects in this vent trap during this discharge period of the boiler return trap and may raise the water level in the vent trap from about the low water line 91 to the high water line 90, for instance. Then, when the return trap has discharged and its float device has descended and vented the steam pressure in its air space so as to reduce this pressure to about the pressure in the dry return 65, the somewhat greater height of the vent trap causes the water that has been received therein during the preceding discharge period to flow promptly into the return trap past the check valve 17 in connection with the additional condensation water that is being received from the dry return 65. This vent trap thus increases the effective water returning capacity of the return trap by reducing the time required to fill the same. Also in case the return trap is out of service the vent trap may be used alone in some cases, especially where the boiler is being run at relatively low pressure under mild weather conditions, for instance. Indeed, in such cases the pressure drop between the boiler and the dry return is some times so small that the gravity head in the vent trap is sufficient to force the condensation water back into the boiler past the check valve 17, 18, in which case the return trap does not need to operate, especially if the float valve of the vent trap closes, until the boiler pressure rises. This vent trap may be constructed as shown in detail in Fig. 3 in which the casing 13 is formed with a vent passage 72 and connected valve seat 71 for the light or hollow ball valve 70 which prevents ingress of air although allowing fairly free venting of any trapped air in this part of the system whenever the venting float valve 78 is withdrawn from its seat. A suitable cage or retainer device 73 of any desired construction may be arranged to protect and support the valve 70 in connection with its seat, and to vent through the holes 66 below the removable cover indicated any air discharged. A yoke such as 64 may be used to support the vent lever 61 and the vent valve 78 which may be pivoted thereto as by the pin 68 and may have a reduced guiding portion or stem 69 projecting upward in the vast passage 72. This yoke 64 may in some cases be screwed on the depending threaded portion of the vent pipe or passage which may thus be screwed into the casing and the vent lever may be pivoted in this yoke as by the pivot 60 and may, if desired, have its angular movement more or less limited as by the pins 62 in this slotted yoke between which the lever may oscillate. A light hollow float 63 may be mounted in connection with a suitable counterweight 67, so that in case for any reason the level of the condensation water rises to such a point as 76, the float rises and closes this vent valve 78 so as to prevent discharge of water from the vent trap. The vent trap may of course be provided with plugged holes such as 74, 75 and 58 for adjustment of the parts or other purposes, and a suitable hand hole and cover in one side of the trap may give access to the valve and other moving parts therein.

This invention has been described in connection with a number of illustrative arrangements, parts, proportions, materials, sizes and connections, and methods of operation and use, to the details of which disclosure the invention is not of course to be limited since what is claimed as new and what is desired to be secured by Letters Patent is set forth in the appended claims:

1. The return and vent trap apparatus for low pressure steam heating systems, comprising a return trap having a connection with the wet return adjacent the boiler, check valves provided in said wet return on each side of said connection, steam and vent connections with the air space of said return trap, steam and vent valves in said return trap controlling said steam and vent connections, a cushioned pivoted rigidly connected float device in said return trap comprising a float and an angularly arranged controlling weight exerting an initial restraining action on said float device to retain it in raised or lowered position until the water level has completely changed, said controlling device exerting a gradually decreasing restraining action and finally accelerating the movement of said float device in either direction, connections enabling said float device to alternately operate said valves during approximately the mid movement of said float device, and a vent trap connected between the dry return of the heating system and the return trap connection with the wet return of the boiler and located at a higher level than said return trap to receive condensation water during the discharge of said return trap and then supply such water thereto.

2. The return and vent trap apparatus for low pressure steam heating systems, comprising a return trap having a connection with the wet return adjacent the boiler, check valves provided in said wet return on each side of said connection, steam and vent connections with the air space of said return trap, steam and vent valves in said return trap controlling said steam and vent connections, a float device in said return trap comprising a float and an angularly arranged controlling weight exerting an initial restraining action on said float device to retain it in raised or lowered position until the water level has completely changed, connections enabling said float device to alternately operate said valves during approximately the mid movement of said float device, and a vent trap connected between the dry return and the return trap connection with the boiler and located at a higher level than said return trap to receive condensation water during the discharge of said return trap and then supply such water thereto.

3. The return and vent trap apparatus for low pressure steam heating systems, comprising a return trap having a connection with the wet return adjacent the boiler, a check valve provided in said wet return adjacent said connection, steam and vent connections with the air space of said return trap, steam and vent valves in said return trap controlling said steam and vent connections, a pivoted rigidly connected float device in said return trap comprising a float and an angularly operating controlling device exerting an initial restraining action on said float device to retain it in raised or lowered position until it quickly moves into its opposite extreme position after the water level has completely changed, connections enabling said float device to alternately operate said valves during the movement of said float device, and a vent trap connected between the dry return of the heating system and the return trap connection with the wet return of the boiler and located at a higher level than said return trap to receive water during the discharge of said return trap and then supply such water thereto.

4. The return and vent trap apparatus for low pressure steam heating systems, comprising a return trap having a connection with the wet return adjacent the boiler, a check valve provided in said wet return adjacent said connection, steam and vent connections with the air space of said return trap, steam and vent valves in said return trap controlling said steam and vent connections, a pivoted float device in said return trap comprising a float and an angularly operating controlling device exerting an initial restraining action on said float device to retain it in raised or lowered position until it quickly moves into its opposite extreme position after the water level has completely changed, connections enabling said float device to alternately operate said valves during the movement of said float device, and a vent trap connected between the dry return of the heating system and the return trap connection with the wet return of the boiler to receive water during the discharge of said return trap and then supply such water thereto.

5. The return and vent trap apparatus for low pressure steam heating systems, comprising a return trap having a connection with the wet return adjacent the boiler, a check valve in said wet return on both sides of said connection, boiler steam pressure and vent connections with the air space of said return trap, steam and vent valves in said return trap controlling said steam and vent connections, a float device in said return trap to alternately operate said valves in accordance with the water level in said return trap, and a vent trap connected between the dry return of the heating system and said return trap connection with the wet return of the boiler, to vent said dry return and to receive condensation water during the discharge of said return trap and then supply such water thereto.

6. The return and vent trap apparatus for low pressure steam heating systems, comprising a return trap having a connection with the wet return adjacent the boiler, a check valve in said wet return adjacent said connection, boiler steam pressure and vent connections with the air space of said return trap, steam and vent valves in said return trap controlling said steam and vent connections, a float device in said return trap to alternately operate said valves in accordance with the water level in said return trap, and a receiving chamber having an automatically closed vent and connected between the dry return of the heating system and said return trap connection with the wet return of the boiler to vent said dry return and to receive condensation water during the discharge of said return trap and then supply such water thereto.

7. The return and vent trap apparatus for low pressure steam heating systems, comprising a return trap having a connection with the wet return adjacent the boiler, a boiler steam connection with the air space of said return trap, a vent connection between said trap and the dry return to the boiler, steam and vent valves in said return trap controlling said steam and vent connections, a float device in said return trap to be operated by the water level therein, connections enabling said float device to alternately operate said valves during the movement of said float device, and a vent trap connected between said dry return and the return trap connection with the wet return of the boiler and located at a higher level than said return trap to vent said dry return and to receive water during the discharge of said return trap and then supply such water thereto.

8. The return and vent trap apparatus for low pressure steam heating systems, comprising a return trap having a connection with the wet return adjacent the boiler, a check valve provided in said wet return adjacent said connection, a boiler steam connection with the air space of said return trap, a vent connection between said trap and the dry return to the boiler, steam and vent valves in said return trap controlling said steam and vent connections, a float device in said return trap to be operated by the water level therein, connections enabling said float device to alternately operate said valves by movement of said float device, means to vent said dry return, and a receiver connected between said dry return and the return trap connection with the wet return of the boiler and located at a higher level than said return trap to receive water during the discharge of said return trap and then supply such water thereto.

9. The return and vent trap apparatus for low pressure steam heating systems, comprising a return trap having a connection with the wet return adjacent the boiler, a check valve provided in said wet return adjacent said connection, a boiler steam connection with the air space of said return trap, a vent connection between said trap and the dry return to the boiler, steam and vent valves in said return trap controlling said steam and vent connections, a float device in said return trap to be operated by the water level therein, connections enabling said float device to operate said valves by movement of said float device, and a receiver having an automatically closed vent and connected between said dry return and the return trap connection with the wet return of the boiler to receive water during the discharge of said return trap and then supply such water thereto.

10. The boiler return trap comprising a casing having pivotally mounted therein a rigidly connected float device comprising a vertically elongated float and connected float lever, a pair of symmetrical laterally arranged controlling arms extending upward from the pivotal portion of said float lever substantially at right angles to said lever, controlling weights rigidly arranged on said controlling arms to exert a restraining action on said float device in both its raised and lowered positions, the turning moment of said controlling weights gradually changing as the float device moves in either direction so as to effect the progressive acceleration of such movement, a valve device secured to said casing and comprising a supporting bracket extending between said controlling arms and supporting the pivot of said float lever, a steam pipe connection and connected valve seat, and a vent pipe connection and connected valve seat, steam and vent valves cooperating with said seats and having connected weighted lifting rods cooperating with said float lever on opposite sides of its pivot to alternately raise said valves from said seats by each movement of the float device.

11. The boiler return trap comprising a casing having pivotally mounted therein a float device comprising a float and connected float lever, a pair of laterally arranged controlling arms extending upward from the pivotal portion of said float lever, controlling weights on said controlling arms to exert a restraining action on said float device in both its raised and lowered position, the turning moment of said controlling weights gradually changing as the float device moves in either direction so as to effect the progressive acceleration of such movement, a valve device secured to said casing, a supporting bracket extending between said controlling arms and supporting the pivot of said float lever, a steam pipe connection and connected valve seat, and a vent pipe connection and connected valve seat, steam and vent valves cooperating with said seats and alternately raised from their seats by each movement of the float device.

12. The boiler return trap comprising a casing having pivotally mounted therein a float device comprising a float and connected float lever, a pair of symmetrical laterally arranged controlling arms extending upward from the pivotal portion of said float lever substantially at right angles to said lever, controlling weights on said controlling arms to exert a restraining action on said float device in both its raised and lowered position, the turning moment of said controlling weights gradually changing as the float device moves in either direction so as to effect acceleration of such movement, steam and vent valves cooperating with seats and having connected weighted lifting rods formed with reduced stems projecting through said float lever to alternately raise said valves from said seats by each movement of the float device, and a water resistance cushioning device connected to said float lever to cushion the movement thereof.

13. The boiler return trap comprising a casing having pivotally mounted therein a float device comprising a float and connected float lever, a pair of symmetrical laterally arranged controlling arms extending upward from the pivotal portion of said float lever substantially at right angles to said lever, controlling weights secured to said controlling arms to exert a restraining action on said float device in both its raised and lowered position, the turning moment of said controlling weights gradually changing as the float device moves in either direction so as to effect the acceleration of such movement, steam and vent valves cooperating with seats and alternately raised from their seats by each movement of the float device.

14. The boiler return trap comprising a casing having pivotally mounted therein a rigidly connected float device comprising a vertically elongated float and connected float lever, a controlling arm extending upward from the pivotal portion of said float lever substantially at right angles to said lever, a heavy controlling weight rigidly secured to said controlling arm to exert a restraining action holding said float device stationary in both its raised and its lowered position until the water level in the return trap reaches the opposite extreme, the turning moment of said controlling weight gradually decreasing as the float device moves in either direction so as to effect the progressive acceleration of such movement, a cushioning device cooperating with said float device and stops to limit its movement, a valve device secured to said casing and comprising a support for the pivotal mounting of said float device, a steam passage and connected valve seat, and a vent passage and connected valve seat, steam and vent valves cooperating with said seats and having connected weighted lifting rods formed with reduced stems projecting through said float lever to be alternately raised from their seats by each movement of the float device, and a deflector on the lifting rod adjacent said steam valve.

15. The boiler return trap comprising a casing having pivotally mounted therein a rigidly connected float device comprising a float and connected float lever, a controlling arm extending upward from the pivotal portion of said float lever substantially at right angles to said lever, a heavy controlling weight rigidly secured to said controlling arm to exert a restraining action holding said float device stationary in both its raised and its lowered position until the water level in the return trap reaches the opposite extreme, the turning moment of said controlling weight gradually decreasing as the float device moves in either direction so as to effect the progressive acceleration of such movement, a cushioning device cooperating with said float device and stops to limit its movement, a valve device secured to said casing and comprising a steam passage and connected valve seat, and a vent passage and connected valve seat, and steam and vent valves cooperating with said seats and having connected weighted lifting rods formed with reduced stems projecting through said float lever to be alternately raised from their seats by each movement of the float device.

16. The boiler return trap comprising a casing having pivotally mounted therein a rigidly connected float device comprising a float and connected float lever, a controlling arm extending upward from the pivotal portion of said float lever substantially at right angles to said lever, a controlling weight on said controlling arm to exert a restraining action holding said float device stationary in both its raised and its lowered position until the water level in the return trap substantially reaches the opposite extreme, the turning moment of said controlling weight gradually changing as the float device moves in either direction so as to effect the progressive acceleration of such movement, a cushioning device cooperating with said float device, a valve device secured to said casing and comprising a steam passage and connected valve seat, and a vent passage and connected valve seat, unbalanced self-closing steam and vent valves cooperating with said seat and having loose operating connection with said float lever to be alternately raised from their seats by each movement of the float device.

17. The boiler return trap comprising a casing having mounted therein a rigidly connected float device comprising a float and connected float lever, a controlling arm extending upward from the pivotal portion of said float lever, a controlling weight secured to said controlling arm to exert a restraining action holding said float device stationary in both its raised and its lowered position until the water level in the return trap substantially reaches the opposite extreme, the turning moment of said controlling weight gradually changing as the float device moves in either direction so as to effect the progressive acceleration of such movement, a steam passage and connected valve seat, and a vent passage and connected valve seat, steam and vent valves cooperating with said seats and having loose operating connection with said lever to be alternately raised from their seats by each movement of the float device.

18. The boiler return trap comprising a casing having pivotally mounted therein a float device comprising a float and connected float lever, a controlling arm extending upward from the pivotal portion of said float lever substantially at right angles to said lever, a heavy controlling weight rigid on said controlling arm to exert a restraining action holding said float device stationary in its raised or lowered position until the water level in the return trap reaches the opposite extreme, the turning moment of said controlling weight gradually changing as the float device moves so as to effect the progressive acceleration of such movement, a cushioning device cooperating with said float device, a valve device comprising a passage and connected valve seat, and an unbalanced valve cooperating with said seat and having a connected weighted lifting rod cooperating with said float lever to raise said valve from said seat by the movement of the float device.

19. The boiler return trap adapted for use with low pressure heating systems comprising a casing having pivotally mounted therein a float device comprising a float and connected float lever, a controlling arm extending upward from the pivotal portion of said float lever and carrying a heavy controlling weight to exert a restraining action holding said float device stationary in its raised or lowered position until the water level in the return trap reaches the opposite extreme, the turning moment of said controlling weight tending to cause movement of said float device, gradually changing as the float device moves so as to effect the progressive acceleration of such movement, a valve device comprising a passage and connected valve seat, and a valve cooperating with said seat and having an operating connection with said float lever to be raised from its seat by the movement of the float device.

20. The boiler return trap adapted for use with low pressure heating systems comprising a casing having pivotally mounted therein a float device comprising a float and connected float lever, a controlling arm extending upward from the pivotal portion of said float lever and carrying a controlling weight to exert a restraining action holding said float device stationary in its raised or lowered position until the water level in the return trap reaches the opposite extreme, the turning moment of said controlling weight ending to cause movement of said float device gradually changing as the float device moves so as to effect the progressive acceleration of such movement, a valve device comprising a passage and connected valve, and having connections to operate said valve by the movement of the float device.

21. The boiler return trap adapted for use with low pressure heating systems comprising a casing having pivotally mounted therein a float device comprising a float and connected controlling weight to exert a restraining action holding said float device stationary in both its raised and lowered position until the water level in the return trap reaches the opposite extreme, the turning moment of said controlling weight gradually changing as the float device moves in either direction so as to effect progressive acceleration of such movement, and pressure and vent passages and valves alternately operated by each movement of the float device.

22. The boiler return trap comprising a casing having pivotally mounted therein a float device comprising a float and connected controlling weight to exert a restraining action holding said float device stationary in an extreme position until the water level in the return trap reaches the opposite extreme, the turning moment of said controlling weight gradually changing as the float device moves so as to effect progressive acceleration of such movement, and pressure and vent passages and valves operated by movement of the float device.

23. The boiler return trap comprising a casing having pivotally mounted therein a float device comprising a float and connected float lever, a controlling weight cooperating with said float lever to exert a restraining action holding said float device stationary in both its raised and its lowered position until the water level in the return trap substantially reaches the opposite extreme, the turning moment of said controlling weight on said float lever gradually changing as the float device moves in either direction so as to effect progressive acceleration of such movement, and steam and vent passages and cooperating valves having loose operating connections with said float lever to be alternately opened and closed by each movement of the float device.

24. The trap comprising a casing having movably mounted therein a float device comprising a float and rigidly connected float lever and controlling weight to exert a restraining action holding said float device stationary in an extreme position until the water level in the trap substantially reaches the opposite extreme, the turning moment of said controlling device on said float lever then gradually changing as the float device moves so as to effect acceleration of said movement, and a valve seat and valve in said casing and having a loose operating connection comprising a lifting knife edge on said float lever.

25. The boiler return trap comprising a casing having pivotally mounted therein a float device comprising a float and a rigidly connected heavy controlling weight to exert a restraining action holding said float device substantially stationary in an extreme position until the water level in the trap reaches the opposite extreme, the turning moment of said controlling weight thereupon gradually changing as the float device moves so as to effect progressive acceleration of such movement, and pressure and vent passages and valves in said casing and operated by the float device during a mid portion of its movement.

26. The boiler return trap comprising a casing having movably mounted therein a float device comprising a float and a rigidly connected controlling weight to exert a restraining action holding said float device substantially stationary in an extreme position until the water level in the trap substantially reaches the opposite extreme, the turning moment of said controlling weight on said float lever thereupon changing as the float device moves so as to effect acceleration of such movement, and a valve seat and cooperating valve in said casing and having loose operating connections with said float device to be operated thereby.

27. The boiler return trap comprising a casing having mounted therein a float device comprising a float and a rigidly connected float lever and controlling device, a valve device comprising a steam pipe connection and connected valve seat, a steam valve cooperating with said seat and having a connected substantially vertical lifting rod formed with a reduced stem projecting through said float lever to raise said valve from its seat by movement of the float device.

28. The boiler return trap comprising a casing having mounted therein a float device comprising a float and connected float lever, a steam pipe connection and connected valve seat, a steam valve cooperating with said seat and having connected substantially vertical lifting rod to raise said steam valve from its seat by movement of the float device; and a deflector on the lifting rod adjacent said steam valve to minimize undesirable condensing contact between the entering steam and the water in said trap.

29. The boiler return trap comprising a casing having mounted therein a float device comprising a float and connected float lever, a valve device comprising a steam pipe connection and connected valve seat, a steam valve cooperating with said seat and having connected substantially vertical lifting rod cooperating with said float lever to raise said steam valve from its seat by movement of the float device, and a deflector on the lifting rod adjacent said steam valve to minimize undesirable condensing contact between the entering steam and the water in said trap.

30. The boiler return trap comprising a casing having mounted therein a float device, a steam pipe connection and connected valve seat, a steam valve cooperating with said seat and having connected substantially vertical lifting rod to be raised from its seat by movement of the float device, and a deflector adjacent said steam valve to minimize undesirable condensing contact between the entering steam and the water in said trap.

31. The boiler return trap comprising a casing having pivotally mounted therein a float device comprising a float and connected controlling device to exert a restraining action holding said float device stationary in an extreme position until the water level in the return trap reaches the opposite extreme, the turning moment of said controlling device gradually changing as the float device moves so as to effect progressive acceleration of such movement, steam and vent passages and valves operated by movement of the float device, and a water dash pot cushioning device connected to said float lever to cushion the movement thereof and having an opening above the water line of said trap to be supplied with steam condensed therein.

32. The boiler return trap comprising a casing having pivotally mounted therein a float device comprising a float and connected float lever, a controlling device cooperating with said float lever to exert a restraining action holding said float device stationary in both its raised and its lowered position until the water level in the return trap substantially reaches the opposite extreme, the turning moment of said controlling device on said float lever gradually changing as the float device moves in either direction so as to effect the progressive acceleration of such movement, steam and vent passages and cooperating valves having loose operating connections with said float lever to be alternately opened and closed by each movement of the float device, and a water dash pot cushioning device connected to said float lever to cushion the movement thereof and having an opening above the water line of said trap to be supplied with steam condensed therein.

33. The return and vent trap apparatus for low pressure steam heating systems, comprising a return trap having a connection with the wet return adjacent the boiler, check valves provided in said wet return adjacent said connection, a boiler steam connection with the air space of said return trap, a vent connection having an automatically closed vent and communicating with said return trap, float operated steam and vent valves controlling said steam and vent connections, and a receiver connected between the dry return and the return trap connection with the wet return of the boiler and located at a higher level than said return trap to receive water during the discharge of said return trap and then supply water thereto.

34. The return and vent trap apparatus for low pressure steam systems, comprising a return trap having a connection with the wet return adjacent the boiler, a steam connection with the air space of said return trap, a vent connection having an automatically closed vent and communicating with said return trap, automatically operated steam and vent valves controlling said steam and vent connections, and a receiver connected between the dry return and the return trap connection with the wet return of the boiler, to receive water during the discharge of said return trap and then supply said water thereto.

35. The return and vent trap apparatus for low pressure steam heating systems, comprising a return trap having a connection with the wet return adjacent the boiler, check valves provided in said wet return adjacent said connection, a boiler steam connection with the air space of said return trap, a vent connection between said trap and the dry return of the boiler, float operated steam and vent valves in said return trap controlling said steam and vent connections and a float controlled vent valve connected between said dry return and the return trap connection with the wet return of the boiler.

JOHN A. SERRELL.
JAMES L. FITTS.
KARL W. ROHLIN.